United States Patent
Ichikawa (10) Patent No.: US 9,802,497 B2
(45) Date of Patent: Oct. 31, 2017

(54) ELECTRIC POWER TRANSMISSION DEVICE, VEHICLE, AND NON-CONTACT ELECTRIC POWER TRANSMISSION AND RECEPTION SYSTEM

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 591 days.

(21) Appl. No.: 14/358,485

(22) PCT Filed: Nov. 24, 2011

(86) PCT No.: PCT/JP2011/077020
§ 371 (c)(1),
(2), (4) Date: May 15, 2014

(87) PCT Pub. No.: WO2013/076834
PCT Pub. Date: May 30, 2013

(65) Prior Publication Data
US 2014/0333128 A1    Nov. 13, 2014

(51) Int. Cl.
*B60L 11/18*    (2006.01)
*H02J 7/02*    (2016.01)
(Continued)

(52) U.S. Cl.
CPC .............. *B60L 11/182* (2013.01); *B60L 7/14* (2013.01); *B60L 11/005* (2013.01); (Continued)

(58) Field of Classification Search
CPC   B60L 11/182; B60L 11/1846; B60L 11/1861; B60L 11/1848; B60L 11/1824;
(Continued)

(56) References Cited

U.S. PATENT DOCUMENTS 6,597,754 B1 *   7/2003   Janesch ................ H03L 7/0991
                                                              375/326
7,741,734 B2    6/2010   Joannopoulos et al.
(Continued)

FOREIGN PATENT DOCUMENTS

| AU | 2006269374 B2 | 1/2007 |
| AU | 2006269374 C1 | 1/2007 |

(Continued)

*Primary Examiner* — Jared Fureman
*Assistant Examiner* — Emmanuel R Dominique
(74) *Attorney, Agent, or Firm* — Oliff PLC (57) ABSTRACT

An electric power transmission device includes an electric power transmission portion, a first communication portion, and a first control device controlling the electric power transmission portion and the first communication portion. A vehicle includes an electric power reception portion, a second communication portion, and a second control device controlling the electric power reception portion and the second communication portion. The first control device and the second control device determine whether or not to cause the electric power transmission portion to transmit electric power based on an instruction from a user which is provided after the user is notified of a status of electric power reception in the electric power reception portion or an estimated status of electric power reception in the electric power reception portion.

24 Claims, 5 Drawing Sheets

(51) Int. Cl.
    *B60L 7/14*     (2006.01)
    *B60L 11/00*    (2006.01)
    *B60L 15/20*    (2006.01)
    *H02J 7/00*     (2006.01)

(52) U.S. Cl.
    CPC ....... *B60L 11/1803* (2013.01); *B60L 11/1824* (2013.01); *B60L 11/1825* (2013.01); *B60L 11/1846* (2013.01); *B60L 11/1848* (2013.01); *B60L 11/1861* (2013.01); *B60L 15/2009* (2013.01); *H02J 7/025* (2013.01); *B60L 2210/30* (2013.01); *B60L 2210/40* (2013.01); *B60L 2220/14* (2013.01); *B60L 2230/16* (2013.01); *B60L 2240/30* (2013.01); *B60L 2240/423* (2013.01); *B60L 2240/547* (2013.01); *B60L 2240/549* (2013.01); *B60L 2240/70* (2013.01); *B60L 2240/80* (2013.01); *B60L 2260/44* (2013.01); *B60L 2270/147* (2013.01); *H02J 2007/0096* (2013.01); *Y02T 10/645* (2013.01); *Y02T 10/705* (2013.01); *Y02T 10/7005* (2013.01); *Y02T 10/7022* (2013.01); *Y02T 10/7044* (2013.01); *Y02T 10/7088* (2013.01); *Y02T 10/7241* (2013.01); *Y02T 10/7275* (2013.01); *Y02T 10/7291* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
    CPC .... H02J 7/025; Y02T 10/7088; Y02T 90/163; Y02T 90/169; Y02T 90/128; Y02T 90/121; Y02T 90/14; Y02T 90/16; Y02T 90/122; Y04S 30/14
    See application file for complete search history.

(56)                  References Cited

U.S. PATENT DOCUMENTS

| | | | |
|---|---|---|---|
| 2007/0222542 A1 | 9/2007 | Joannopoulos et al. | |
| 2008/0278264 A1 | 11/2008 | Karalis et al. | |
| 2009/0156268 A1 | 6/2009 | Kim et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0117596 A1* | 5/2010 | Cook .................. | B60L 11/182 320/108 |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0161216 A1* | 6/2010 | Yamamoto ............ | B60L 11/182 701/408 |
| 2010/0161217 A1 | 6/2010 | Yamamoto | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0082612 A1 | 4/2011 | Ichikawa | |
| 2011/0270462 A1 | 11/2011 | Amano et al. | |
| 2011/0302078 A1* | 12/2011 | Failing .................... | B60L 3/00 705/39 |
| 2012/0323423 A1 | 12/2012 | Nakamura et al. | |
| 2013/0200718 A1 | 8/2013 | Ogawa et al. | |
| 2014/0292270 A1 | 10/2014 | Ichikawa | |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101459981 A | 6/2009 |
| CN | 101682216 A | 3/2010 |
| CN | 101860089 A | 10/2010 |
| CN | 102217163 A | 10/2011 |
| CN | 103917400 A | 7/2014 |
| EP | 1 902 505 A2 | 3/2008 |
| EP | 2 071 695 A2 | 6/2009 |
| EP | 2 130 287 A1 | 12/2009 |
| EP | 2 777 976 A1 | 9/2014 |
| IN | 735/DELNP/2008 | 5/2008 |
| IN | 6195/DELNP/2009 | 7/2010 |
| JP | 2009-501510 | 1/2009 |
| JP | A-2009-148151 | 7/2009 |
| JP | A-2010-35333 | 2/2010 |
| JP | A-2010-74992 | 4/2010 |
| JP | A-2010-103200 | 5/2010 |
| JP | A-2010-119246 | 5/2010 |
| JP | 2010-172184 A | 8/2010 |
| JP | A-2010-172185 | 8/2010 |
| JP | 2010252497 A | 11/2010 |
| JP | 2011-188679 A | 9/2011 |
| JP | 2011-223657 A | 11/2011 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | 2010/052785 A1 | 5/2010 |
| WO | 20101055381 A1 | 5/2010 |

* cited by examiner

ELECTRIC POWER TRANSMISSION DEVICE, VEHICLE, AND NON-CONTACT ELECTRIC POWER TRANSMISSION AND RECEPTION SYSTEM

TECHNICAL FIELD

This invention relates to an electric power transmission device, a vehicle, and a non-contact electric power transmission and reception system.

BACKGROUND ART

In recent years, in order to reduce carbon dioxide emitted from cars for prevention of global warming, an electric car or a hybrid car which runs with electric energy instead of or in addition to fuel has attracted attention. In addition, a plug-in-hybrid car configured to allow charging of a battery mounted also in the hybrid car with electric energy from outside of the vehicle has also emerged.

Connection of a charging cable in externally supplying electric power to a car, however, imposes extra burden on a user. Therefore, a non-contact electric power supply system which can start charging without requiring an effort to connect a cable when a car has been parked at a prescribed position has also been studied.

Japanese Patent Laying-Open No. 2010-119246 (PTD 1) discloses a non-contact charging system in which variation in efficiency is detected by transmitting weak electric power while a frequency is varied and a position of a coil is adjusted in accordance with a result of detection.

In addition, Japanese Patent Laying-Open No. 2010-172185 (PTD 2) discloses an electric power reception guidance device capable of notifying a user of an optimal position for charging of a vehicle by informing the user of electric power reception efficiency at a current vehicle position.

CITATION LIST

Patent Document

PTD 1: Japanese Patent Laying-Open No. 2010-119246
PTD 2: Japanese Patent Laying-Open No. 2010-172185
PTD 3: Japanese Patent Laying-Open No. 2010-035333
PTD 4: WO2010/052785
PTD 5: Japanese Patent Laying-Open No. 2009-148151

SUMMARY OF INVENTION

Technical Problem

In order to receive supply of electric power in a non-contact manner, a non-contact electric power transmission device is required. In charging of a battery of an electric car or the like in a house or the like, it is also possible to set up an electric power transmission device dedicated for that car, however, in a public space, apartments, and the like, an electric power transmission device shared by a large number of electric cars and the like is set up. Thus, adaptation to a large number of combinations of electric power transmission devices and vehicles should be made.

Even though combination of an electric power transmission device and a vehicle is the same, adaptation to change in a state of a vehicle (such as whether or not a driver and/or a passenger is/are present, whether or not load is carried, or displacement of a parking position) should also be made.

Since electric power transmission efficiency is different depending on relative positional relation between an electric power transmission portion and an electric power reception portion in non-contact transmission and reception of electric power, at which location of a vehicle electric power transmission is to be started greatly affects efficiency in charging and a time period for charging.

Accuracy in registration between an electric power transmission portion of an electric power transmission device and an electric power reception portion of a vehicle is different for each user. In addition, allowable efficiency in charging or positional relation between an electric power transmission portion and an electric power reception portion is also different depending on sensibility of each user. Therefore, since it is assumed that a condition for desiring start of electric power transmission and reception is different for each user, it is desirable to construct a charging system reflecting user's intention.

Japanese Patent Laying-Open No. 2010-119246 (PTD 1), Japanese Patent Laying-Open No. 2010-172185 (PTD 2), and the like do not specifically disclose a condition for starting charging, and there is a room for improvement in realizing power feed in accordance with user's intention.

An object of this invention is to provide an electric power transmission device, a vehicle, and a non-contact electric power transmission and reception system, with which electric power transmission and reception not in accordance with user's intention can be avoided.

Solution to Problem

In summary, this invention is directed to an electric power transmission device externally transmitting electric power to a vehicle, which includes an electric power transmission portion for transmitting electric power in a non-contact manner to the vehicle, a communication portion for communicating with the vehicle, and a control device controlling the electric power transmission portion and the communication portion. The control device determines whether or not to cause the electric power transmission portion to transmit electric power based on an instruction from a user which is provided after the user is notified of a status of electric power reception of the vehicle or an estimated status of electric power reception of the vehicle.

Preferably, the control device carries out authentication by using the communication portion for identifying the vehicle and causes the electric power transmission portion to transmit prescribed electric power in order to know the status of electric power reception of the vehicle before completion of authentication. Then, the control device causes the electric power transmission portion to transmit electric power higher than the prescribed electric power after completion of authentication.

More preferably, the control device stops transmission of the prescribed electric power from the electric power transmission portion when the instruction is not provided from the user in spite of lapse of a prescribed period of time while the prescribed electric power is transmitted from the electric power transmission portion.

More preferably, the control device regards electric power transmitted to the vehicle after completion of authentication as electric power for which fees should be charged.

More preferably, the control device checks the status of electric power reception by causing the electric power transmission portion to transmit the prescribed electric power after a parking position for electric power transmission of the vehicle is set and immediately before charging of a power storage device mounted on the vehicle is started.

Preferably, a difference in natural frequency between the electric power transmission portion and an electric power reception portion of the vehicle is within ±10%.

Preferably, a coefficient of coupling between an electric power reception portion of the vehicle and the electric power transmission portion is not greater than 0.1.

Preferably, the electric power transmission portion transmits electric power to an electric power reception portion of the vehicle through at least one of magnetic field formed between the electric power reception portion and the electric power transmission portion and oscillating at a specific frequency and electric field formed between the electric power reception portion and the electric power transmission portion and oscillating at a specific frequency.

In another aspect, this invention is directed to a vehicle configured to be able to receive electric power in a non-contact manner from an electric power transmission device outside the vehicle, which includes an electric power reception portion for receiving electric power in a non-contact manner from the electric power transmission device, a communication portion for communicating with the electric power transmission device, and a control device controlling the electric power reception portion and the communication portion. The control device determines whether or not to receive electric power transmission from the electric power transmission device based on an instruction from a user which is provided after the user is notified of a status of electric power reception of the electric power reception portion or an estimated status of electric power reception of the electric power reception portion.

Preferably, the control device communicates information for authentication by using the communication portion for causing the electric power transmission device to identify the vehicle and causes the electric power transmission device to transmit prescribed electric power in order to know a status of electric power reception in the electric power reception portion before completion of authentication. Then, the control device causes the electric power transmission device to transmit electric power higher than the prescribed electric power after completion of authentication.

More preferably, the control device stops transmission of the prescribed electric power from the electric power transmission device when the instruction is not provided from the user in spite of lapse of a prescribed period of time while the prescribed electric power is transmitted from the electric power transmission device.

More preferably, the electric power transmission device regards electric power transmitted to the vehicle after completion of authentication as electric power for which fees should be charged.

More preferably, the vehicle further includes a power storage device. The control device checks the status of electric power reception by causing the electric power transmission device to transmit the prescribed electric power after a parking position for electric power transmission of the vehicle is set and immediately before charging of the power storage device is started.

Preferably, a difference in natural frequency between an electric power transmission portion of the electric power transmission device and the electric power reception portion of the vehicle is within ±10%.

Preferably, a coefficient of coupling between the electric power reception portion and an electric power transmission portion of the electric power transmission device is not greater than 0.1.

Preferably, an electric power transmission portion of the electric power transmission device transmits electric power to the electric power reception portion through at least one of magnetic field formed between the electric power reception portion and the electric power transmission portion and oscillating at a specific frequency and electric field formed between the electric power reception portion and the electric power transmission portion and oscillating at a specific frequency.

In yet another aspect, this invention is directed to a non-contact electric power transmission and reception system, including a vehicle configured to be able to receive electric power in a non-contact manner from outside of the vehicle and an electric power transmission device externally transmitting electric power to the vehicle. The electric power transmission device includes an electric power transmission portion for transmitting electric power in a non-contact manner to the vehicle, a first communication portion for communicating with the vehicle, and a first control device controlling the electric power transmission portion and the first communication portion. The vehicle includes an electric power reception portion for receiving electric power in a non-contact manner from the electric power transmission portion, a second communication portion for communicating with the first communication portion, and a second control device controlling the electric power reception portion and the second communication portion. The first control device and the second control device determine whether or not to cause the electric power transmission portion to transmit electric power based on an instruction from a user which is provided after the user is notified of a status of electric power reception of the electric power reception portion or an estimated status of electric power reception of the electric power reception portion.

Preferably, the first control device and the second control device communicate information for authentication identifying the vehicle by using the first communication portion and the second communication portion and cause the electric power transmission portion to transmit prescribed electric power in order to know the status of electric power reception in the electric power reception portion before completion of authentication. Then, at least any of the first control device and the second control device causes the electric power transmission portion to transmit electric power higher than the prescribed electric power after completion of authentication.

More preferably, at least any of the first control device and the second control device stops electric power transmission of the prescribed electric power from the electric power transmission portion when the instruction is not provided from the user in spite of lapse of a prescribed period of time while the prescribed electric power is transmitted from the electric power transmission portion.

More preferably, at least any of the first control device and the second control device regards electric power transmitted to the vehicle after completion of authentication as electric power for which fees should be charged.

More preferably, at least any of the first control device and the second control device checks the status of electric power reception by causing the electric power transmission portion to transmit the prescribed electric power after a parking position for electric power transmission of the vehicle is set and immediately before charging of a power storage device mounted on the vehicle is started.

Preferably, a difference in natural frequency between the electric power transmission portion and the electric power reception portion of the vehicle is within ±10%.

Preferably, a coefficient of coupling between the electric power reception portion and the electric power transmission portion is not greater than 0.1.

Preferably, the electric power transmission portion transmits electric power to the electric power reception portion through at least one of magnetic field formed between the electric power reception portion and the electric power transmission portion and oscillating at a specific frequency and electric field formed between the electric power reception portion and the electric power transmission portion and oscillating at a specific frequency.

Advantageous Effects of Invention

According to the present invention, in non-contact charging in which electric power transmission and reception efficiency may fluctuate, since a user can recognize or predict a status of electric power reception in advance, electric power transmission and reception as desired by the user is facilitated, for example, in determining a status of electric power reception and then determining whether to carry out registration again or to immediately start charging without re-doing registration.

DESCRIPTION OF EMBODIMENTS

An embodiment of the present invention will be described hereinafter in detail with reference to the drawings. In the drawings, the same or corresponding elements have the same reference characters allotted and description thereof will not be repeated.

Figure 1:
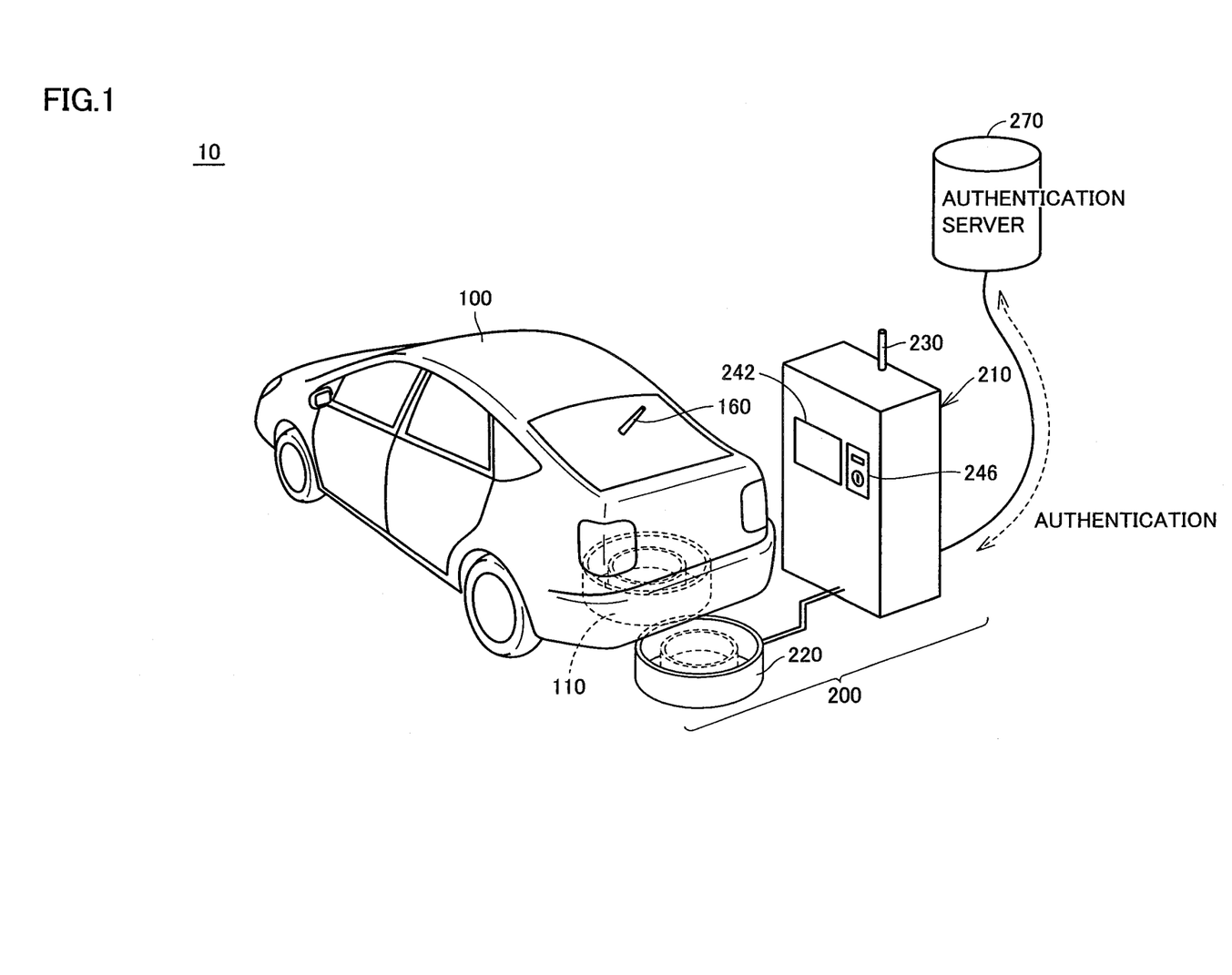
FIG. 1 is an overall configuration diagram of an electric power transmission and reception system according to an embodiment of this invention.

FIG. 1 is an overall configuration diagram of an electric power transmission and reception system according to an embodiment of this invention.

Referring to FIG. 1, an electric power transmission and reception system 10 includes a vehicle 100 and an electric power transmission device 200. Vehicle 100 includes an electric power reception portion 110 and a communication portion 160. Electric power transmission device 200 authenticates a vehicle by referring to vehicle data registered in an authentication server 270.

In a case of a shared electric power transmission device, fees may be charged to an owner (or a user) of a charged vehicle. In addition, even in a case that no fee is charged, limitation of a vehicle to be charged may be desired (for example, a case that an electric power transmission device is owned by a company and charging limited to cars for company use is desired, a case that a vehicle incompatible with an electric power transmission device is desirably excluded, or the like).

In such a case, in order to identify an owner or a user of a vehicle or to identify a vehicle, authentication is carried out by establishing communication between a vehicle and an electric power transmission device. Authentication does not necessarily involve fee charging so long as such identification is carried out.

Electric power reception portion 110 is installed on a bottom surface of a vehicle body and configured to receive in a non-contact manner, electric power sent from an electric power transmission portion 220 of electric power transmission device 200. Specifically, electric power reception portion 110 includes a self-resonance coil (also referred to as a resonant coil) which will be described later, and receives electric power from electric power transmission portion 220 in a non-contact manner, by resonation through electromagnetic field with a self-resonance coil included in electric power transmission portion 220. Communication portion 160 is a communication interface for communication between vehicle 100 and electric power transmission device 200.

Electric power transmission device 200 includes a charging station 210 and electric power transmission portion 220. Charging station 210 includes a display portion 242, a fee reception portion 246, and a communication portion 230. Charging station 210 converts, for example, commercial AC power to high-frequency electric power and outputs high-frequency electric power to electric power transmission portion 220. It is noted that charging station 210 may receive supply of electric power from such a power supply device as a solar power generation device and a wind power generation device.

Electric power transmission portion 220 is installed, for example, on a floor surface of a parking lot, and configured to send in a non-contact manner, high-frequency electric power supplied from charging station 210 to electric power reception portion 110 of vehicle 100. Specifically, electric power transmission portion 220 includes a self-resonance coil and transmits electric power to electric power reception portion 110 in a non-contact manner as this self-resonance coil resonates through electromagnetic field with the self-resonance coil included in electric power reception portion 110. Communication portion 230 is a communication interface for communication between electric power transmission device 200 and vehicle 100.

Here, in power feed from electric power transmission device 200 to vehicle 100, vehicle 100 should be guided to electric power transmission device 200 for registration between electric power reception portion 110 of vehicle 100 and electric power transmission portion 220 of electric power transmission device 200. Namely, registration of vehicle 100 is not easy. A portable device can be carried with a user's hand and easily placed at an appropriate position of a power feed unit such as a charger. The vehicle, however, should be parked at an appropriate position through an operation of the vehicle by a user, and it is impossible to carry the vehicle with his/her hand for position adjustment.

Therefore, for power feed from electric power transmission device 200 to vehicle 100, a method high in tolerance for position displacement is desirably adopted. It has been said about the electromagnetic induction method that a transmission distance is short and tolerance for position displacement is also low. If an attempt to adopt the electromagnetic induction method for power feed to a vehicle is made, it is possible that highly accurate driver's driving technique is required at the time of parking, a highly accurate vehicle guide device should be mounted on a vehicle, or a movable portion for moving a coil position so as to cover a rough parking position is necessary.

It has been said about a resonant method based on electromagnetic field that relatively high electric power can be transmitted even when a transmission distance is several m and tolerance for position displacement is also generally higher than the electromagnetic induction method. Therefore, in electric power transmission and reception system 10 according to this embodiment, electric power is fed from electric power transmission device 200 to vehicle 100 by using a resonant method.

It is noted that, in the electric power transmission and reception system according to the present embodiment, a natural frequency of electric power transmission portion 220 and a natural frequency of electric power reception portion 110 are the same.

The "natural frequency of the electric power transmission portion" means an oscillation frequency in a case that an electric circuit including a coil and a capacitor of the electric power transmission portion freely oscillates. It is noted that a natural frequency at the time when braking force or electric resistance is set to zero or substantially zero in an electric circuit including a coil and a capacitor of the electric power transmission portion is called a "resonance frequency of the electric power transmission portion."

Similarly, the "natural frequency of the electric power reception portion" means an oscillation frequency in a case that an electric circuit including a coil and a capacitor of the electric power reception portion freely oscillates. A natural frequency at the time when braking force or electric resistance is set to zero or substantially zero in an electric circuit including a coil and a capacitor of the electric power reception portion is called a "resonance frequency of the electric power reception portion."

The "same natural frequency" herein means not only a case that the natural frequencies are exactly the same but also a case that natural frequencies are substantially the same. "Substantially the same natural frequency" means that a difference between a natural frequency of the electric power transmission portion and a natural frequency of the electric power reception portion is within ±10% of the natural frequency of the electric power transmission portion or the natural frequency of the electric power reception portion.

Figure 2:
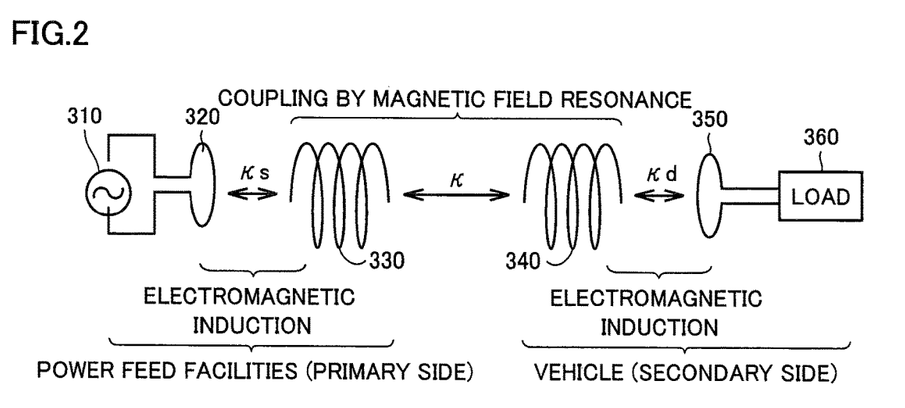
FIG. 2 is a diagram for illustrating principles of electric power transmission using a resonant method.

FIG. 2 is a diagram for illustrating principles of electric power transmission using a resonant method.

Referring to FIG. 2, according to this resonant method, two LC resonance coils having the same natural frequency resonate in electromagnetic field (near field) as in resonance of two tuning forks, so that electric power is transmitted from one coil to the other coil through electromagnetic field.

Specifically, a primary coil 320 is connected to a high-frequency power supply 310 and high-frequency electric power is fed to a primary self-resonance coil 330 magnetically coupled to primary coil 320 through electromagnetic induction. Primary self-resonance coil 330 is an LC resonator with an inductance and a stray capacitance of the coil itself and resonates with a secondary self-resonance coil 340, which is the same in resonance frequency as primary self-resonance coil 330, through electromagnetic field (near field). Then, energy (electric power) moves from primary self-resonance coil 330 to secondary self-resonance coil 340 through electromagnetic field. Energy (electric power) that moved to secondary self-resonance coil 340 is extracted by a secondary coil 350 magnetically coupled to secondary self-resonance coil 340 through electromagnetic induction and supplied to a load 360. It is noted that electric power transmission with the resonant method is realized when a Q value indicating intensity of resonance between primary self-resonance coil 330 and secondary self-resonance coil 340 is greater, for example, than 100.

In addition, in the electric power transmission and reception system according to the present embodiment, by causing the electric power transmission portion and the electric power reception portion to resonate through electromagnetic field, electric power is transmitted from the electric power transmission portion to the electric power reception portion, and a coefficient of coupling (κ) between the electric power transmission portion and the electric power reception portion is preferably not greater than 0.1. It is noted that a coefficient of coupling (κ) is not limited to this value and it can take various values at which good electric power transmission is achieved. It is noted that, in electric power transmission generally making use of electromagnetic induction, a coefficient of coupling (κ) between the electric power transmission portion and the electric power reception portion is close to 1.0.

It is noted that, with regard to correspondence with FIG. 1, secondary self-resonance coil 340 and secondary coil 350 correspond to electric power reception portion 110 in FIG. 1 and primary coil 320 and primary self-resonance coil 330 correspond to electric power transmission portion 220 in FIG. 1.

Figure 3:
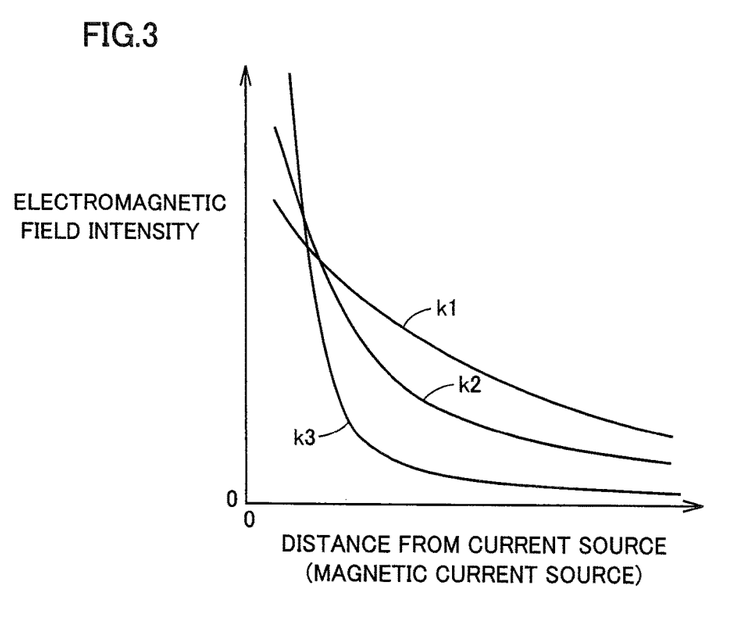
FIG. 3 is a diagram showing relation between a distance from a current source (magnetic current source) and electromagnetic field intensity.

FIG. 3 is a diagram showing relation between a distance from a current source (magnetic current source) and electromagnetic field intensity.

Referring to FIG. 3, electromagnetic field includes three components. A curve k1 represents a component inversely proportional to a distance from a wave source and it is referred to as "radiation electromagnetic field." A curve k2 represents a component inversely proportional to a square of a distance from a wave source and it is referred to as "induction electromagnetic field." In addition, a curve k3 represents a component inversely proportional to a cube of a distance from a wave source and it is referred to as "static electromagnetic field."

Here, there is an area where intensity of electromagnetic waves sharply decreases with a distance from the wave source. According to the resonant method, however, energy (electric power) is transmitted by making use of this near field (evanescent field). Namely, a pair of resonators (for example, a pair of LC resonance coils) having the same natural frequency is caused to resonate by making use of the near field, so that energy (electric power) is transmitted from one resonator (primary self-resonance coil) to the other resonator (secondary self-resonance coil). Since this near field does not propagate energy (electric power) over a long distance, the resonant method can achieve electric power transmission with less energy loss than electromagnetic waves transmitting energy (electric power) by means of the "radiation electromagnetic field" propagating energy over a long distance.

Figure 4:
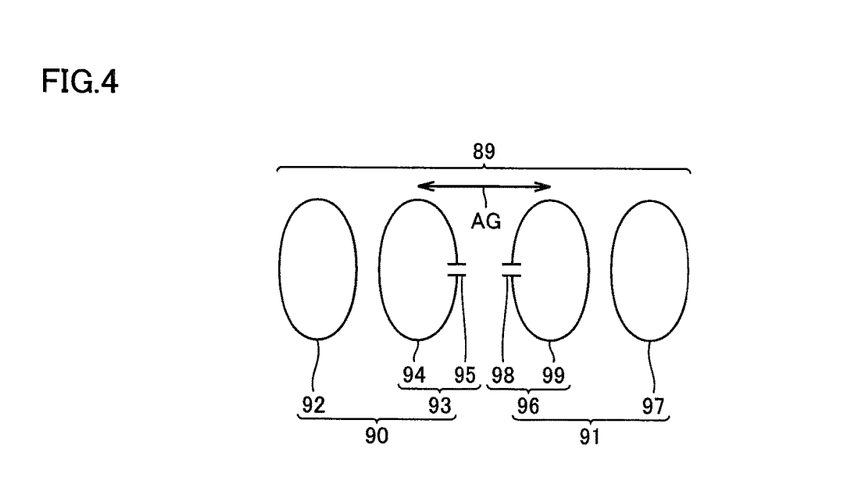
FIG. 4 is a diagram showing a simulation model of an electric power transmission system.

FIG. 4 is a diagram showing a simulation model of an electric power transmission system.

Figure 5:
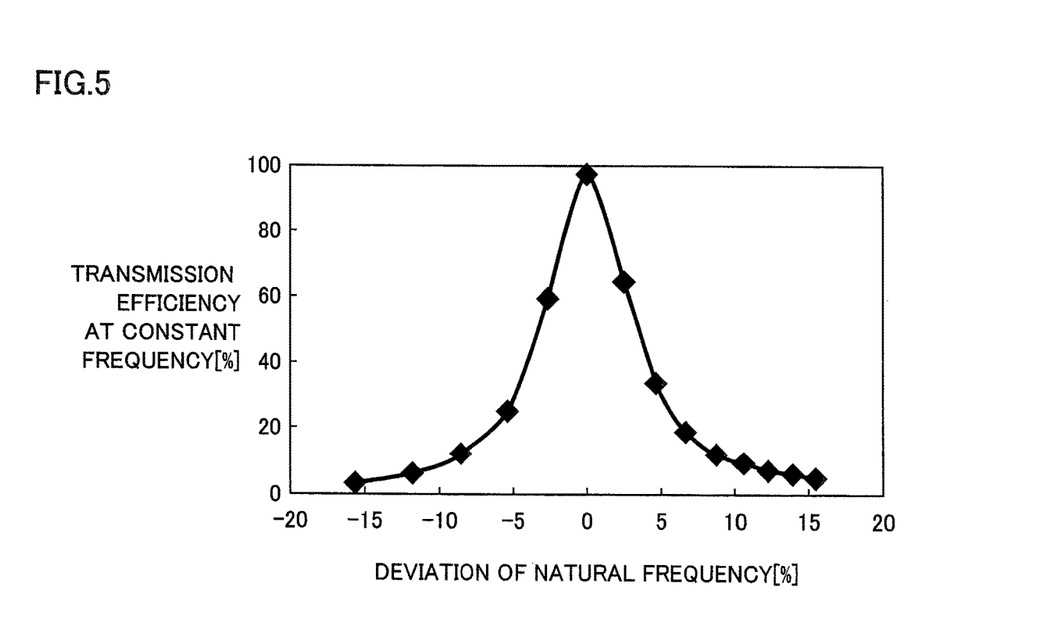
FIG. 5 is a diagram showing relation between efficiency and deviation in natural frequency between an electric power transmission device and an electric power reception device.

FIG. 5 is a diagram showing relation between efficiency and deviation in natural frequency between an electric power transmission device and an electric power reception device.

Simulation results of analysis of relation between a difference in natural frequency and electric power transmission efficiency will be described with reference to FIGS. 4 and 5. An electric power transmission system 89 includes an electric power transmission device 90 and an electric power reception device 91. Electric power transmission device 90 includes an electromagnetic induction coil 92 and an electric power transmission portion 93. Electric power transmission portion 93 includes a resonant coil 94 and a capacitor 95 provided in resonant coil 94.

Electric power reception device 91 includes an electric power reception portion 96 and an electromagnetic induction coil 97. Electric power reception portion 96 includes a resonant coil 99 and a capacitor 98 connected to this resonant coil 99.

An inductance of resonant coil 94 is denoted as an inductance Lt and a capacitance of capacitor 95 is denoted as a capacitance C1. An inductance of resonant coil 99 is denoted as an inductance Lr and a capacitance of capacitor 98 is denoted as a capacitance C2. With setting of each parameter as such, a natural frequency f1 of electric power transmission portion 93 is expressed in an equation (1) below and a natural frequency f2 of electric power reception portion 96 is expressed in an equation (2) below.

$$f1=1/\{2\pi(Lt \times C1)^{1/2}\} \quad (1)$$

$$f2=1/\{2\pi(Lr \times C2)^{1/2}\} \quad (2)$$

Here, relation between deviation in natural frequency between electric power transmission portion 93 and electric power reception portion 96 and electric power transmission efficiency in a case that inductance Lr and capacitances C1, C2 are fixed and only inductance Lt is varied is shown in FIG. 3. It is noted that, in this simulation, relative positional relation between resonant coil 94 and resonant coil 99 is fixed and in addition, a frequency of a current supplied to electric power transmission portion 93 is constant.

In the graph shown in FIG. 5, the abscissa represents deviation (%) in natural frequency and the ordinate represents transmission efficiency (%) at a constant frequency. Deviation (%) in natural frequency is expressed in an equation (3) below.

$$\text{(Deviation in Natural Frequency)}=\{(f1-f2)/f2\} \times 100 \quad (\%) \quad (3)$$

As is clear also from FIG. 5, when deviation (%) in natural frequency is ±0%, electric power transmission efficiency is close to 100%. When deviation (%) in natural frequency is ±5%, electric power transmission efficiency is 40%. When deviation (%) in natural frequency is ±10%, electric power transmission efficiency is 10%. When deviation (%) in natural frequency is ±15%, electric power transmission efficiency is 5%. Namely, it can be seen that electric power transmission efficiency can be enhanced to a practical level by setting a natural frequency of each of the electric power transmission portion and the electric power reception portion such that an absolute value of deviation (%) in natural frequency (difference in natural frequency) is not greater than 10% of the natural frequency of electric power reception portion 96. In addition, electric power transmission efficiency can further be enhanced by setting a natural frequency of each of the electric power transmission portion and the electric power reception portion such that an absolute value of deviation (%) in natural frequency is not higher than 5% of the natural frequency of electric power reception portion 96, which is further preferred. It is noted that electromagnetic field analysis software (JMAG (trademark): manufactured by JSOL Corporation)) is adopted as simulation software.

Figure 6:
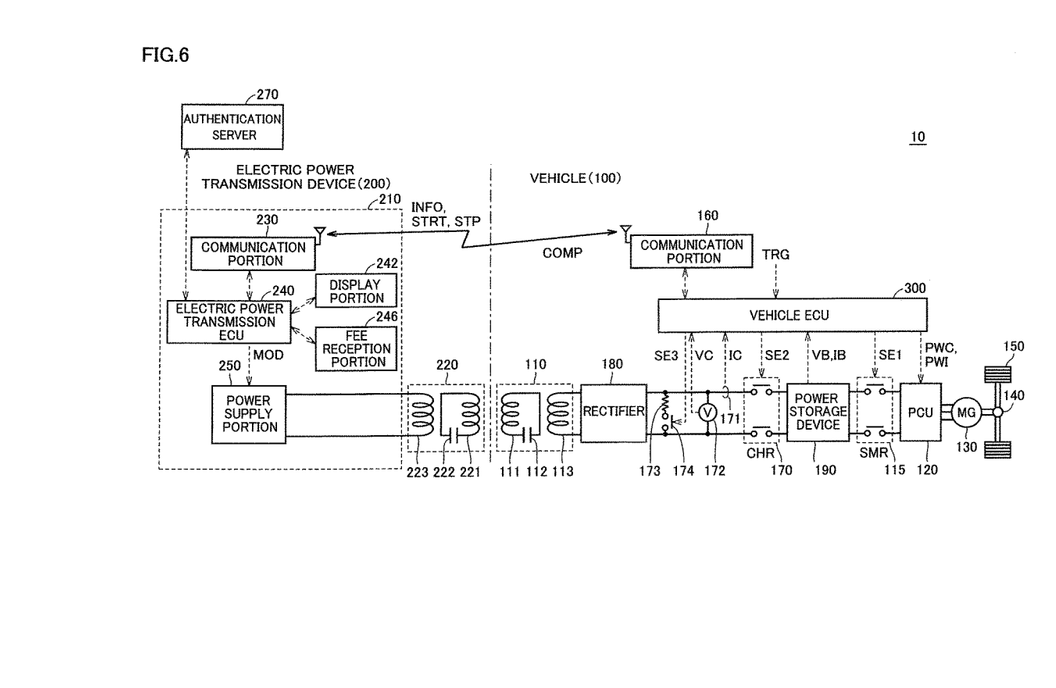
FIG. 6 is a detailed configuration diagram of an electric power transmission and reception system 10 shown in FIG. 1.

FIG. 6 is a detailed configuration diagram of electric power transmission and reception system 10 shown in FIG. 1. Referring to FIG. 6, vehicle 100 includes, in addition to electric power reception portion 110 and communication portion 160, a rectifier 180, a charge relay (CHR) 170, a power storage device 190, a system main relay (SMR) 115, a power control unit PCU 120, a motor generator 130, a motive power transmission gear 140, a drive wheel 150, a vehicle ECU (Electronic Control Unit) 300 representing a control device, a current sensor 171, and a voltage sensor 172. Electric power reception portion 110 includes a secondary self-resonance coil 111, a capacitor 112, and a secondary coil 113.

Though an electric car is described as vehicle 100 by way of example in the present embodiment, a configuration of vehicle 100 is not limited thereto so long as a vehicle can run with electric power stored in a power storage device. Other examples of vehicle 100 include a hybrid vehicle incorporating an engine, a fuel cell car incorporating a fuel cell, and the like.

Secondary self-resonance coil 111 receives electric power through electromagnetic field by means of electromagnetic resonance from a primary self-resonance coil 221 included in electric power transmission device 200.

The number of turns of this secondary self-resonance coil 111 and a distance between coils are set as appropriate based on a distance from primary self-resonance coil 221 of electric power transmission device 200, resonant frequencies of primary self-resonance coil 221 and secondary self-resonance coil 111, and the like, such that a Q value indicating intensity of resonance between primary self-resonance coil 221 and secondary self-resonance coil 111 is greater (for example, Q>100) and a coefficient of coupling (κ) indicating a degree of coupling thereof or the like is small (for example, not greater than 0.1).

Capacitor 112 is connected to opposing ends of secondary self-resonance coil 111 and forms an LC resonance circuit together with secondary self-resonance coil 111. A capacitance of capacitor 112 is set as appropriate to achieve a prescribed resonant frequency in accordance with an inductance of secondary self-resonance coil 111. It is noted that, in a case that a desired resonance frequency is obtained with a stray capacitance of secondary self-resonance coil 111 itself, no capacitor 112 may be provided.

Secondary coil 113 is provided coaxially with secondary self-resonance coil 111 and it can magnetically couple to secondary self-resonance coil 111 through electromagnetic induction. This secondary coil 113 extracts electric power received by secondary self-resonance coil 111 through electromagnetic induction and outputs electric power to rectifier 180.

Rectifier 180 rectifies AC power received from secondary coil 113 and outputs rectified DC power to power storage device 190 through CHR 170. Rectifier 180 can be configured, for example, to include a diode bridge and a smoothing capacitor (neither of which is shown). Though what is called a switching regulator which carries out rectification based on switching control can also be employed as rectifier 180, rectifier 180 may also be included in electric power reception portion 110, and in order to prevent malfunction or the like of a switching element involved with generated electromagnetic field, a static rectifier such as a diode bridge is more preferably adopted.

Though the present embodiment is configured such that DC power rectified by rectifier 180 is directly output to power storage device 190, if a rectified DC voltage is different from a charging voltage which can be tolerated by power storage device 190, a DC/DC converter (not shown) for voltage conversion may be provided between rectifier 180 and power storage device 190.

A load resistor 173 and a relay 174 for position detection which are connected in series are connected to an output portion of rectifier 180. After authentication of a vehicle is completed and before full-fledged charging is started, weak electric power is transmitted as a signal for testing from electric power transmission device 200 to the vehicle. Here, relay 174 is controlled by a control signal SE3 from vehicle ECU 300 and rendered conductive.

Voltage sensor 172 is provided between a power line pair connecting rectifier 180 and power storage device 190 to each other. Voltage sensor 172 detects a DC voltage on a secondary side of rectifier 180, that is, a power reception voltage received from electric power transmission device 200, and outputs a detection value VC to vehicle ECU 300. Vehicle ECU 300 determines electric power reception efficiency based on voltage VC and transmits information on electric power reception efficiency to the electric power transmission device through communication portion 160.

Current sensor 171 is provided in a power line connecting rectifier 180 and power storage device 190 to each other. Current sensor 171 detects a charging current for power storage device 190 and outputs a detection value IC to vehicle ECU 300.

CHR 170 is electrically connected to rectifier 180 and power storage device 190. CHR 170 is controlled by a control signal SE2 from vehicle ECU 300 and switches between supply and cut-off of electric power from rectifier 180 to power storage device 190.

Power storage device 190 is an electric power storage element configured to be chargeable and dischargeable. Power storage device 190 is implemented, for example, by such a secondary battery as a lithium ion battery, a nickel metal hydride battery, or a lead acid battery, or a power storage element such as an electric double layer capacitor.

Power storage device 190 is connected to rectifier 180 with CHR 170 being interposed. Power storage device 190 stores electric power received by electric power reception portion 110 and rectified by rectifier 180. In addition, power storage device 190 is connected also to PCU 120 with SMR 115 being interposed. Power storage device 190 supplies electric power for generating vehicle driving force to PCU 120. Moreover, power storage device 190 stores electric power generated by motor generator 130. Output from power storage device 190 is, for example, around 200 V.

Power storage device 190 is provided with a voltage sensor and a current sensor for detecting a voltage VB and an input and output current IB of power storage device 190, although they are not shown. These detection values are output to vehicle ECU 300. Vehicle ECU 300 calculates a state of charge (also referred to as "SOC") of power storage device 190 based on these voltage VB and current IB.

SMR 115 is interposed in a power line connecting power storage device 190 and PCU 120 to each other. Then, SMR 115 is controlled by a control signal SE1 from vehicle ECU 300 and switches between supply and cut-off of electric power between power storage device 190 and PCU 120.

PCU 120 includes a converter and an inverter, although they are not shown. The converter converts a voltage from power storage device 190 under the control by a control signal PWC from vehicle ECU 300. The inverter drives motor generator 130 with the use of electric power converted by the converter, under the control by a control signal PWI from vehicle ECU 300.

Motor generator 130 is an AC rotating electric machine, and for example, it is a permanent magnet type synchronous motor including a rotor having a permanent magnet embedded.

Output torque of motor generator 130 is transmitted to drive wheel 150 through motive power transmission gear 140 to thereby run vehicle 100. Motor generator 130 can generate electric power with rotational force of drive wheel 150 during a regenerative braking operation of vehicle 100. Then, PCU 120 causes generated electric power to be converted to charging power for power storage device 190.

In a hybrid car incorporating an engine (not shown) in addition to motor generator 130, the engine and motor generator 130 are operated in coordination, so that necessary vehicle driving force is generated. In this case, power storage device 190 can be charged also with electric power generated through rotation of the engine.

As described above, communication portion 160 is a communication interface for wireless communication between vehicle 100 and electric power transmission device 200. Communication portion 160 outputs to electric power transmission device 200, battery information INFO including SOC of power storage device 190 from vehicle ECU 300. In addition, communication portion 160 outputs to electric power transmission device 200, signals STRT, STP indicating start and stop of electric power transmission from electric power transmission device 200.

Vehicle ECU 300 includes a CPU (Central Processing Unit), a storage device, and an input/output buffer, none of which is shown in FIG. 1, receives input of signals from each sensor and the like and outputs control signals to each device, and controls vehicle 100 and each device. It is noted that such control is not limited to processing by software and processing with dedicated hardware (electronic circuitry) can also be performed.

When vehicle ECU 300 receives a charge start signal TRG resulting from an operation or the like by a user, it outputs signal STRT indicating start of electric power transmission to electric power transmission device 200 through communication portion 160 based on a prescribed condition being satisfied. Alternatively, vehicle ECU 300 outputs signal STP indicating stop of electric power transmission to electric power transmission device 200 through communication portion 160, based on power storage device 190 being fully charged, an operation by a user, or the like.

Electric power transmission device 200 includes charging station 210 and electric power transmission portion 220. Charging station 210 further includes, in addition to communication portion 230, an electric power transmission ECU 240 representing a control device, a power supply portion 250, display portion 242, and fee reception portion 246. Furthermore, electric power transmission portion 220 includes primary self-resonance coil 221, a capacitor 222, and a primary coil 223.

Power supply portion 250 is controlled by a control signal MOD from electric power transmission ECU 240 and converts electric power received from an AC power supply such as a commercial power supply to high-frequency electric power. Then, power supply portion 250 supplies resultant high-frequency electric power to primary coil 223.

Though no matching device for impedance conversion is shown in FIG. 6, a configuration may be such that a matching device is provided between power supply portion 250 and electric power transmission portion 220 or between electric power reception portion 110 and rectifier 180.

Primary self-resonance coil 221 transfers electric power by means of electromagnetic resonance to secondary self-resonance coil 111 included in electric power reception portion 110 of vehicle 100.

The number of turns of this primary self-resonance coil 221 and a distance between coils are set as appropriate based on a distance from secondary self-resonance coil 111 of vehicle 100, resonant frequencies of primary self-resonance coil 221 and secondary self-resonance coil 111, and the like, such that a Q value indicating intensity of resonance between primary self-resonance coil 221 and secondary self-resonance coil 111 is greater (for example, Q>100) and κ indicating a degree of coupling thereof or the like is small (for example, not greater than 0.1).

Capacitor 222 is connected to opposing ends of primary self-resonance coil 221 and forms an LC resonance circuit together with primary self-resonance coil 221. A capacitance of capacitor 222 is set as appropriate to achieve a prescribed resonant frequency in accordance with an inductance of primary self-resonance coil 221. It is noted that, in a case that a desired resonance frequency is obtained with a stray capacitance of primary self-resonance coil 221 itself, no capacitor 222 may be provided.

Primary coil 223 is provided coaxially with primary self-resonance coil 221 and it can magnetically couple to primary self-resonance coil 221 through electromagnetic induction. Primary coil 223 transmits high-frequency electric power supplied through a matching device 260 to primary self-resonance coil 221 through electromagnetic induction.

As described above, communication portion 230 is a communication interface for wireless communication between electric power transmission device 200 and vehicle 100. Communication portion 230 receives battery information INFO transmitted from communication portion 160 on the side of vehicle 100, signals STRT, STP indicating start and stop of electric power transmission, and information on authentication of the vehicle, and outputs such information to electric power transmission ECU 240.

Electric power transmission ECU 240 includes a CPU, a storage device, and an input/output buffer, none of which is shown in FIG. 1, receives input of signals from each sensor and the like and outputs control signals to each device, and controls each device in charging station 210. It is noted that such control is not limited to processing by software and processing with dedicated hardware (electronic circuitry) can also be performed.

Electric power transmission ECU 240 and vehicle ECU 300 are coordinated with each other through communication portions 160, 230 and perform the processing below. When communication is established, whether or not a vehicle is a vehicle adapted to non-contact charging is found.

When non-contact electric power transmission and reception is carried out, registration between the electric power reception portion on the vehicle side and the electric power transmission portion on the electric power transmission device side is important. In the electric power transmission and reception system in the present embodiment, electric power transmitted from the electric power transmission portion and received by the electric power reception portion is used for registration between the electric power transmission portion and the electric power reception portion.

In a case of such an electric power transmission and reception system, unless it is confirmed that registration does not give rise to a problem before completion of authentication, user's convenience may significantly be impaired by such necessity that a vehicle should again be moved for registration after it is once stopped and authenticated, or the like. In addition, if authentication is carried out while a position is displaced and electric power is transmitted and received at that position as it is, charging may be carried out with transmission efficiency remaining poor.

Therefore, in order to carry out registration and authentication without impairing user's convenience, the order of registration and authentication is important.

When a vehicle with which communication has been established is a vehicle adapted to non-contact charging, for registration, electric power transmission portion 240 causes power supply portion 250 to transmit a test signal with the use of prescribed electric power. Prescribed electric power should only be electric power with which efficiency in electric power transmission and reception can be checked, however, preferably, weak electric power is used. It is noted that weak electric power includes electric power lower than electric power during full-fledged electric power transmission (such as charging power for charging a battery or driving power for driving such a load as an air conditioner mounted on a vehicle). Weak electric power is electric power which is transmitted for registration and it may include intermittently transmitted electric power.

In order to receive a test signal, vehicle ECU 300 transmits control signals SE2, SE3 so as to set relay 174 to an ON state and set CHR 170 to an OFF state. Then, electric power received in electric power reception portion 110 is detected by voltage sensor 172 on the vehicle side, and electric power reception efficiency and charging efficiency are calculated based on voltage VC. Vehicle ECU 300 transmits calculated charging efficiency or electric power reception efficiency to electric power transmission device 200 through communication portion 160. A position of a vehicle is adjusted based on voltage VC, such that received electric power, charging efficiency, or electric power reception efficiency exceeds a threshold value.

A position of a vehicle may be adjusted by a driver operating and moving the vehicle, or a position of a vehicle may be adjusted by using a parking assistance system such that the vehicle automatically moves.

After the position of the vehicle is determined and it is confirmed that there is no problem in electric power reception efficiency, authentication is carried out in order to identify a vehicle or to identify a charger. Authentication is carried out by checking authentication information transmitted from vehicle 100 via communication portions 160, 230 to electric power transmission device 200 with authentication server 270. After completion of authentication, fees are charged to a user or an owner of the vehicle for subsequent charging power. Transmission to the user of information such as electric power reception efficiency or an electric power unit price prior to authentication is more preferred.

Display portion 242 of electric power transmission device 200 displays to the user, received electric power, charging efficiency or electric power reception efficiency, and a charging power unit price corresponding thereto. Display portion 242 also has a function as an input portion like a touch panel or the like, and can accept input of whether or not the user approves received electric power, charging efficiency or electric power reception efficiency, and a charging power unit price corresponding thereto.

Instead of or in addition to display on display portion 242 of electric power transmission device 200, more preferably, these are displayed on a screen provided in a driver's seat or the like of vehicle 100, and user approval data is directly transmitted from the vehicle to electric power transmission ECU 240.

When a charging power unit price is approved, electric power transmission ECU 240 causes power supply portion 250 to start full-fledged charging after authentication is carried out. Then, when charging is completed, the fees are paid through fee reception portion 246.

Fee charging is based on information on an approved vehicle, however, if cash, a prepaid card, a credit card, or the like is inserted in fee reception portion 246 before charging, the fees may be paid by the same.

Figure 7:
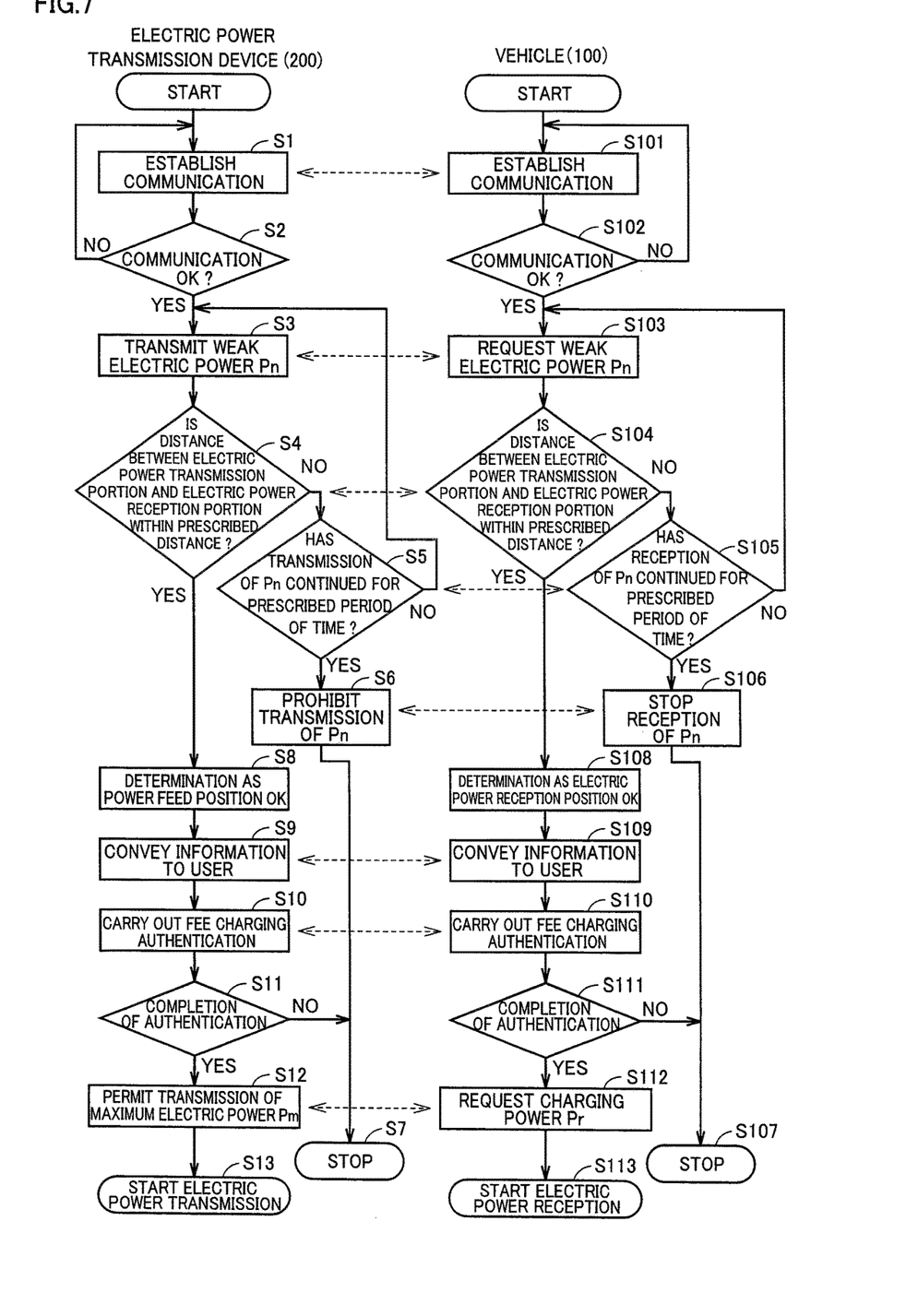
FIG. 7 is a flowchart for illustrating control carried out in an electric power transmission device and a vehicle.

FIG. 7 is a flowchart for illustrating control carried out in the electric power transmission device and the vehicle.

Referring to FIGS. 6 and 7, when the process is started, initially in step S1, in electric power transmission device 200, electric power transmission ECU 240 communicates with the vehicle by using communication portion 230. In addition, in step S101, in vehicle 100, vehicle ECU 300 communicates with the electric power transmission device by using communication portion 160.

In electric power transmission device 200, in step S2, electric power transmission ECU 240 determines whether or not communication has been established. When communication has not been established, the process returns to step S1.

On the other hand, in vehicle 100, in step S102, vehicle ECU 300 determines whether or not communication has been established. When communication has not been established, the process returns to step S101. It is noted that this determination of establishment of communication should only be made in at least any one of vehicle ECU 300 and electric power transmission ECU 240, and a result of determination may be transferred to the other through communication.

When it is determined in step S102 that communication has been established, the process proceeds to step S103. In step S103, vehicle ECU 300 requests through communication portions 160, 230, electric power transmission ECU 240 for transmission of prescribed electric power. Prescribed electric power should only be electric power with which efficiency in electric power transmission and reception can be checked. In the present embodiment, transmission of weak electric power Pn is requested as prescribed electric power by way of a preferred example. In response to this request, electric power transmission ECU 240 instructs power supply portion 250 to transmit weak electric power. Then, as electric power transmission portion 220 is fed with power, weak electric power is transmitted in a non-contact manner to electric power reception portion 110 of the vehicle.

It is noted that prescribed electric power transmitted in step S3 is lower than maximum electric power Pm of which transmission is subsequently permitted in step S12 and it preferably is not higher than one tenth in magnitude.

In transmission of a weak current, prior thereto, vehicle ECU 300 turns on relay 174. Then, this weak electric power is received by electric power reception portion 110, a voltage of received electric power is detected by voltage sensor 172, and the detected voltage is compared with a prescribed threshold voltage, so that whether or not a distance between the electric power transmission portion and the electric power reception portion is within a prescribed distance is determined. This determination processing may be performed in vehicle ECU 300 or electric power transmission ECU 240.

When vehicle ECU 300 makes determination, a value detected by a voltage sensor 172 is compared with the threshold value in step S104, and a result of determination is transmitted to electric power transmission ECU 240 through communication portions 160, 230.

Alternatively, when electric power transmission ECU 240 makes determination, a value detected by voltage sensor 127 is transmitted to electric power transmission ECU 240 through communication portions 160, 230 in step S104 and electric power transmission ECU 240 compares the detected value and the threshold value with each other.

When it is determined in step S4 that a distance between the electric power transmission portion and the electric power reception portion is not within the prescribed distance, the process proceeds to step S5 and whether or not transmission of weak electric power Pn has continued for a prescribed period of time is determined.

On the other hand, when it is determined in step S104 that the distance between the electric power transmission portion and the electric power reception portion is not within the prescribed distance, the process proceeds to step S105 and whether or not reception of weak electric power Pn has continued for a prescribed period of time is determined.

Determination of duration of transmission or reception in step S5 or step S105 is made in at least any one of electric power transmission ECU 240 and vehicle ECU 300, and a result should only be transferred to the other ECU through communication. The upper limit of a duration of transmission or reception is set to a very short period of time (such as within 1 hour).

When a time period of transmission of weak electric power Pn has not reached the prescribed period of time in step S5, the process returns to step S3 and transmission of weak electric power Pn is continued. Alternatively, when a time period of reception of week electric power Pn has not reached the prescribed period of time in step S105, the process returns to step S103 and reception of weak electric power Pn is continued.

While transmission and reception of weak electric power Pn is thus continued, the user of the vehicle moves a position of the vehicle for registration. It is noted that this registration may be carried out by automatic running including automatic steering.

On the other hand, when a time period of transmission of weak electric power Pn has reached the prescribed period of time in step S5, the process proceeds to step S6 and transmission of weak electric power Pn is prohibited. Alternatively, when a time period of reception of weak electric power Pn has reached the prescribed period of time in step S105, the process proceeds to step S106 and reception of weak electric power Pn is prohibited. The prescribed period of time is a time period serving as a threshold value for determining time up. Such a case means that registration has not been completed in time, and determination as time up is made.

For example, it is also possible that a long period of time elapses without registration while weak electric power is transmitted. In such a case, by stopping electric power transmission after lapse of a prescribed period of time, power consumption in the electric power transmission device can be reduced. In addition, transmission of electric power before fee charging also to a vehicle of which registration is not carried out intentionally can be prevented from being continued.

A transmission prohibition instruction or a reception stop instruction in step S6 or step S106 is given by at least any of electric power transmission ECU 240 and vehicle ECU 300, and a result should only be transferred to the other ECU through communication.

After processing for transmission prohibition and reception stop is performed in step S6, step S106, the processing for electric power transmission and reception is stopped in step S7, step S107.

On the other hand, in electric power transmission device 200, when it is determined in step S4 that the distance between the electric power transmission portion and the electric power reception portion is within the prescribed distance, the process proceeds to step S8. In step S8, determination that the position of the vehicle is good as a power feed position is certified.

Similarly, in vehicle 100 as well, when it is determined in step S104 that the distance between the electric power transmission portion and the electric power reception portion is within the prescribed distance, the process proceeds to step S108. In step S108, determination that the position of the vehicle is good as an electric power reception position is certified.

It is noted that a subject which determines whether or not a position of a vehicle is good as an electric power reception position or a power feed position may be an ECU or a user himself/herself. For example, electric power reception efficiency is shown with a numeric value (%) or with an indicator on a display portion (such as a liquid crystal display like a touch panel) in a vehicle, and an operation portion with which an instruction to start charging (such as a push button displayed on the liquid crystal display) can be given is provided. Then, when a position of the vehicle is adjusted and charging efficiency acceptable to the user is achieved, the user himself/herself may operate the operation portion to give an instruction to start charging. Alternatively, when charging efficiency acceptable to the user is achieved, the user operates a parking brake for completion of parking. The vehicle may be configured such that an instruction to start charging is given in coordination with this operation of the parking brake.

Then, in step S9 and/or step S109, processing for conveying information to the user is performed. This information includes a status of electric power reception (electric power reception efficiency or a value associated with the electric power reception efficiency), an electric power reception unit price, or the like. Regarding a method of conveying information to the user, the information may be displayed on a liquid crystal screen provided in the vehicle or voice and sound may be used. Alternatively, information may be displayed on a screen provided in the electric power transmission device or notification through voice and sound may be given from the electric power transmission device.

Registration using weak electric power is thus completed through the process above.

In succession, the user determines whether or not to carry out charging, based on the information conveyed to the user. For example, when electric power reception efficiency is lower than expected, the user may determine that compatibility between that charging station and the vehicle is bad and charging may not be carried out. Such a case is not completion of authentication in step S11 and step S111, and hence charging processing stops in step S7, step S107. Thus, electric power transmission and reception not in accordance with the user's intention can be avoided.

On the other hand, when the user selects charging, necessary vehicle information is checked with data in authentication server 270 and fee charging authentication is carried out in step S10 and step S110. When the vehicle is a vehicle of which charging is permitted, authentication is completed in step S11 and step S111.

When authentication is completed, electric power transmission device 200 permits transmission of maximum electric power Pm in step S12. Then, in step S112, vehicle ECU 300 requests charging power Pr to electric power transmission device 200. When requested charging power Pr is not higher than maximum electric power Pm, electric power as requested is transmitted from electric power transmission device 200 to vehicle 100.

Then, in step S13, electric power transmission device 200 starts electric power transmission, and in step S113, vehicle 100 starts electric power reception.

As above, by defining start of full-fledged charging as the reference for incurring fees for charging, to which of the user and a charging station operator fees should be charged for electric power transmitted before start of full-fledged charging (during registration or the like) can clearly be distinguished.

Finally, referring again to the drawings, the present embodiment will be summarized. Electric power transmission and reception system 10 includes vehicle 100 configured to be able to receive electric power in a non-contact manner from the outside of the vehicle and electric power transmission device 200 externally transmitting electric power to vehicle 100. Electric power transmission device 200 includes electric power transmission portion 220 for transmitting electric power in a non-contact manner to vehicle 100, communication portion 230 for communicating with vehicle 100, and electric power transmission ECU 240 controlling electric power transmission portion 220 and communication portion 230. Vehicle 100 includes electric power reception portion 110 for receiving electric power in a non-contact manner from electric power transmission portion 220, communication portion 160 for communicating with communication portion 230, and vehicle ECU 300 controlling electric power reception portion 110 and communication portion 160. Electric power transmission ECU 240 and vehicle ECU 300 determine whether or not to cause electric power transmission portion 220 to transmit electric power based on an instruction from a user which is provided after the user is notified of a status of electric power reception of electric power reception portion 110 or an estimated status of electric power reception of electric power reception portion 110.

Though monitoring of a voltage of received electric power by transmitting weak electric power is shown in the embodiment by way of example of knowing a status of electric power reception, if a status of electric power reception is predictable, it is not particularly necessary to transmit weak electric power. For example, it is possible as another method of knowing a status of electric power reception to predict a status of electric power reception by estimating from a camera image, a distance or positional relation between the electric power transmission portion and the electric power reception portion. For example, it is also possible to estimate a distance or positional relation between the electric power transmission portion and the electric power reception portion and to predict a status of electric power reception by using such a sensor as an infrared sensor.

Preferably, electric power transmission ECU 240 and vehicle ECU 300 communicate information for authentication identifying the vehicle by using communication portion 230 and communication portion 160 and cause electric power transmission portion 220 to transmit prescribed electric power in order to know the status of electric power reception in electric power reception portion 110 before completion of authentication. Then, the control device (electric power transmission ECU 240 and/or vehicle ECU 300) causes electric power transmission portion 220 to transmit electric power higher than prescribed electric power after completion of authentication.

More preferably, at least any of electric power transmission ECU 240 and vehicle ECU 300 stops transmission of prescribed electric power from electric power transmission portion 220 when the instruction is not provided from the user in spite of lapse of a prescribed period of time while prescribed electric power is transmitted from electric power transmission portion 220.

Preferably, the control device (electric power transmission ECU 240 and/or vehicle ECU 300) notifies a driver and/or a passenger of vehicle 100 of a status of electric power reception of the vehicle which was known by supplying prescribed electric power to electric power transmission portion 220, before completion of authentication.

More preferably, the control device (electric power transmission ECU 240 and/or vehicle ECU 300) regards electric power transmitted to vehicle 100 after completion of authentication as electric power for which fees should be charged.

More preferably, the control device (electric power transmission ECU 240 and/or vehicle ECU 300) causes electric power transmission portion 220 to transmit prescribed electric power and checks the status of electric power reception after a parking position for electric power transmission of vehicle 100 is set and immediately before charging of power storage device 190 mounted on vehicle 100 is started.

Since a status of electric power reception can be known by actually transmitting electric power before fee charging authentication in the present embodiment, a state of electric power reception such as accurate electric power reception efficiency can be known and adjustment such as coil registration can be made before fee charging authentication. In addition, with fee charging authentication serving as the reference, which of a user and an operator of a charging station or the like should bear fees for electric power transmitted before authentication can clearly be distinguished.

Then, by transmitting electric power lower than normal transmission electric power during registration before completion of fee charging authentication, load imposed on the electric power transmission device can be mitigated.

In addition, by informing the user in advance of a status of electric power reception such as charging efficiency which has been known before fee charging authentication, the user can determine whether or not to accept fee charging authentication after he/she recognized the status of electric power reception.

Moreover, by knowing a status of electric power reception such as charging efficiency immediately before completion of authentication, difference from charging efficiency or the like in actual charging after authentication can be minimized.

It is noted that, in the electric power transmission and reception system according to the present embodiment as above, by causing the electric power transmission portion and the electric power reception portion to resonate through electromagnetic field, electric power is transmitted from the electric power transmission portion to the electric power reception portion. Coupling between the electric power transmission portion and the electric power reception portion in such electric power transmission is referred to, for example, as "magnetic resonant coupling," "magnetic field resonant coupling," "electromagnetic field resonance coupling," or "electric field resonance coupling."

"Electromagnetic resonance coupling" means coupling including any of "magnetic resonant coupling," "magnetic field resonant coupling," and "electric field resonance coupling."

Since an antenna in a coil shape is adopted for the electric power transmission portion and the electric power reception portion described herein, the electric power transmission portion and the electric power reception portion are coupled to each other mainly through magnetic field, and the electric power transmission portion and the electric power reception portion are in "magnetic resonant coupling" or "magnetic field resonant coupling."

It is noted that, for example, an antenna such as a meandering line can also be adopted for the electric power transmission portion and the electric power reception portion, and in this case, the electric power transmission portion and the electric power reception portion are coupled to each other mainly through electric field. Here, the electric power transmission portion and the electric power reception portion are in "electric field resonance coupling."

Though a case that an electromagnetic induction coil is included in an electric power transmission unit and an electric power reception unit has been exemplified in the present embodiment, the present invention is applicable also to a case that any one or both of the electric power transmission unit and the electric power reception unit includes no electromagnetic induction coil (a case that only a self-resonance coil is employed).

Though description has been given in the present embodiment above by way of example of charging, the present invention is applicable also to a case that received electric power is used for applications other than charging. For example, a similar effect is obtained even in a case that such a load as auxiliary machinery of a vehicle is driven with received electric power.

Regarding electric power transmission before and after authentication, though an example in which non-contact power feed is carried out with a resonant scheme has been described in detail in the present embodiment, the present embodiment can be applied as modified even to other schemes of the resonant scheme. So long as a scheme uses transmission of weak electric power from an electric power transmission device for registration, it is applicable also to other schemes of the resonant scheme (for example, a non-contact electric power transmission and reception scheme using electromagnetic induction, microwaves or the like).

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

10 electric power transmission and reception system; 89 electric power transmission system; 90, 200 electric power transmission device; 91 electric power reception device; 92, 97 electromagnetic induction coil; 93, 220, 240 electric power transmission portion; 94, 99 resonant coil; 95, 98 capacitor; 96, 110, 220 electric power reception portion; 100 vehicle; 111, 340 secondary self-resonance coil; 112, 222 capacitor; 113, 350 secondary coil; 127, 172 voltage sensor; 130 motor generator; 140 motive power transmission gear;

150 drive wheel; 160, 230, 160, 230 communication portion; 171 current sensor; 173 load resistor; 174 relay; 180 rectifier; 190 power storage device; 210 charging station; 221, 330 primary self-resonance coil; 223, 320 primary coil; 240 electric power transmission ECU; 242 display portion; 246 fee reception portion; 250 power supply portion; 260 matching device; 270 authentication server; 300 vehicle ECU; 310 high-frequency power supply; 360 load; and PCU power control unit.

The invention claimed is:

1. An electric power transmission device externally transmitting electric power to a vehicle, the electric power transmission device comprising:
   an electric power transmission portion for transmitting electric power in a non-contact manner to an electric power reception portion of the vehicle;
   a communication portion for communicating with the vehicle; and
   a control device controlling the electric power transmission portion and the communication portion, the control device:
      checking whether the electric power reception portion and the electric power transmission portion are properly positioned relative to each other after the vehicle completes positioning with respect to the electric power transmission portion and before electric power transmission from the electric power transmission portion to the electric power reception portion;
      allowing the electric power transmission portion to start electric power transmission to the vehicle based on a request from the vehicle when the electric power reception portion and the electric power transmission portion are properly positioned relative to each other;
      causing the electric power transmission portion to transmit weak electric power based on a positioning request from the vehicle;
      checking whether the electric power reception portion and the electric power transmission portion are properly positioned relative to each other after positioning using the weak electric power; and
      causing the electric power transmission portion to transmit electric power based on a charging request, the transmitted electric power being larger than the weak electric power.

2. The electric power transmission device according to claim 1, wherein
   the control device carries out authentication by using the communication portion for identifying the vehicle and causes the electric power transmission portion to transmit prescribed electric power in order to know a status of electric power reception of the vehicle before completion of the authentication, and
   the control device causes the electric power transmission portion to transmit electric power higher than the prescribed electric power after completion of the authentication.

3. The electric power transmission device according to claim 2, wherein
   the control device stops transmission of the prescribed electric power from the electric power transmission portion when an instruction is not provided from a user in spite of a lapse of a prescribed period of time while the prescribed electric power is transmitted from the electric power transmission portion.

4. The electric power transmission device according to claim 2, wherein
   the control device regards electric power transmitted to the vehicle after completion of the authentication as electric power for which fees should be charged.

5. The electric power transmission device according to claim 2, wherein
   the control device checks the status of electric power reception by causing the electric power transmission portion to transmit the prescribed electric power after a parking position for electric power transmission of the vehicle is set and immediately before charging of a power storage device mounted on the vehicle is started.

6. The electric power transmission device according to claim 1, wherein
   a difference in natural frequency between the electric power transmission portion and the electric power reception portion of the vehicle is within ±10%.

7. The electric power transmission device according to claim 1, wherein
   a coefficient of coupling between the electric power reception portion of the vehicle and the electric power transmission portion is not greater than 0.1.

8. The electric power transmission device according to claim 1, wherein
   the electric power transmission portion transmits electric power to the electric power reception portion of the vehicle through at least one of: a magnetic field formed between the electric power reception portion and the electric power transmission portion oscillating at a specific frequency, and an electric field formed between the electric power reception portion and the electric power transmission portion oscillating at a specific frequency.

9. A vehicle configured to be able to receive electric power in a non-contact manner from an electric power transmission device outside the vehicle, the vehicle comprising:
   an electric power reception portion for receiving electric power in a non-contact manner from the electric power transmission device;
   a communication portion for communicating with the electric power transmission device; and
   a control device controlling the electric power reception portion and the communication portion, the control device:
      checking whether the electric power reception portion and an electric power transmission portion of the electric power transmission device are properly positioned relative to each other after the vehicle completes positioning with respect to the electric power transmission portion and before electric power transmission from the electric power transmission portion to the electric power reception portion;
      transmitting a requesting signal to the electric power transmission device;
      transmitting a positioning request after communication has been established;
      informing a user about position information based on a weak electric power from the electric power transmission portion; and
      checking whether the electric power reception portion and the electric power transmission portion are properly positioned relative to each other after positioning.

10. The vehicle according to claim 9, wherein
   the control device communicates information for authentication by using the communication portion for causing the electric power transmission device to identify the vehicle and causes the electric power transmission device to transmit prescribed electric power in order to know a status of electric power reception in the electric power reception portion before completion of the authentication, and the control device causes the electric power transmission device to transmit electric power higher than the prescribed electric power after completion of the authentication.

11. The vehicle according to claim 10, wherein
the control device stops transmission of the prescribed electric power from the electric power transmission device when an instruction is not provided from the user in spite of a lapse of a prescribed period of time while the prescribed electric power is transmitted from the electric power transmission device.

12. The vehicle according to claim 10, wherein
the electric power transmission device regards electric power transmitted to the vehicle after completion of the authentication as electric power for which fees should be charged.

13. The vehicle according to claim 10, further comprising a power storage device, wherein
the control device checks the status of electric power reception by causing the electric power transmission device to transmit the prescribed electric power after a parking position for electric power transmission of the vehicle is set and immediately before charging of the power storage device is started.

14. The vehicle according to claim 9, wherein
a difference in natural frequency between the electric power transmission portion of the electric power transmission device and the electric power reception portion of the vehicle is within ±10%.

15. The vehicle according to claim 9, wherein
a coefficient of coupling between the electric power reception portion and the electric power transmission portion of the electric power transmission device is not greater than 0.1.

16. The vehicle according to claim 9, wherein
the electric power transmission portion of the electric power transmission device transmits electric power to the electric power reception portion through at least one of: a magnetic field formed between the electric power reception portion and the electric power transmission portion oscillating at a specific frequency, and an electric field formed between the electric power reception portion and the electric power transmission portion oscillating at a specific frequency.

17. A non-contact electric power transmission and reception system comprising:
a vehicle configured to be able to receive in a non-contact manner electric power from outside of the vehicle; and
an electric power transmission device externally transmitting electric power to the vehicle, the electric power transmission device including:
an electric power transmission portion for transmitting electric power in a non-contact manner to the vehicle;
a first communication portion for communicating with the vehicle; and
a first control device controlling the electric power transmission portion and the first communication portion;
the vehicle including:
an electric power reception portion for receiving electric power in a non-contact manner from the electric power transmission portion;
a second communication portion for communicating with the first communication portion; and
a second control device controlling the electric power reception portion and the second communication portion;
at least one of the first control device and the second control device checking whether the electric power reception portion and the electric power transmission portion are properly positioned relative to each other after the vehicle completes positioning with respect to the electric power transmission portion and before electric power transmission from the electric power transmission portion to the electric power reception portion;
the first control device allowing the electric power transmission portion to start electric power transmission to the vehicle based on a request from the vehicle when the electric power reception portion and the electric power transmission portion are properly positioned relative to each other;
the first control device causing the electric power transmission portion to transmit weak electric power based on a positioning request from the vehicle;
at least one of the first control device and the second control device checking whether the electric power reception portion and the electric power transmission portion are properly positioned relative to each other after positioning using the weak electric power; and
the first control device causing the electric power transmission portion to transmit electric power based on a charging request, the transmitted electric power being larger than the weak electric power.

18. The non-contact electric power transmission and reception system according to claim 17, wherein
the first control device and the second control device communicate information for authentication identifying the vehicle by using the first communication portion and the second communication portion and cause the electric power transmission portion to transmit prescribed electric power in order to know a status of electric power reception in the electric power reception portion before completion of the authentication, and
at least any of the first control device and the second control device causes the electric power transmission portion to transmit electric power higher than the prescribed electric power after completion of the authentication.

19. The non-contact electric power transmission and reception system according to claim 18, wherein
at least any of the first control device and the second control device stops electric power transmission of the prescribed electric power from the electric power transmission portion when an instruction is not provided from a user in spite of a lapse of a prescribed period of time while the prescribed electric power is transmitted from the electric power transmission portion.

20. The non-contact electric power transmission and reception system according to claim 18, wherein
at least any of the first control device and the second control device regards electric power transmitted to the vehicle after completion of the authentication as electric power for which fees should be charged.

21. The non-contact electric power transmission and reception system according to claim 18, wherein at least any of the first control device and the second control device checks the status of electric power reception by causing the electric power transmission portion to transmit the prescribed electric power after a parking position for electric power transmission of the vehicle is set and immediately before charging of a power storage device mounted on the vehicle is started.

22. The non-contact electric power transmission and reception system according to claim 17, wherein
a difference in natural frequency between the electric power transmission portion and the electric power reception portion of the vehicle is within ±10%.

23. The non-contact electric power transmission and reception system according to claim 17, wherein
a coefficient of coupling between the electric power reception portion and the electric power transmission portion is not greater than 0.1.

24. The non-contact electric power transmission and reception system according to claim 17, wherein
the electric power transmission portion transmits electric power to the electric power reception portion through at least one of: a magnetic field formed between the electric power reception portion and the electric power transmission portion oscillating at a specific frequency, and an electric field formed between the electric power reception portion and the electric power transmission portion oscillating at a specific frequency.

\* \* \* \* \*